United States Patent
Yu et al.

(10) Patent No.: US 11,819,836 B2
(45) Date of Patent: Nov. 21, 2023

(54) METHOD FOR SYNTHESIZING 2D ULTRATHIN ZIF-67 WITH HIERARCHICAL POROUS STRUCTURE

(71) Applicant: Fuzhou University, Fujian (CN)

(72) Inventors: Yan Yu, Fujian (CN); Zanyong Zhuang, Fujian (CN); Lairan He, Fujian (CN); Yitong Feng, Fujian (CN); Guoxin Zhuang, Fujian (CN)

(73) Assignee: FUZHOU UNIVERSITY, Fujian (CN)

( * ) Notice: Subject to any disclaimer, the term of this patent is extended or adjusted under 35 U.S.C. 154(b) by 38 days.

(21) Appl. No.: 17/833,593

(22) Filed: Jun. 6, 2022

(65) Prior Publication Data

US 2023/0063877 A1   Mar. 2, 2023

(30) Foreign Application Priority Data

Aug. 25, 2021  (CN) .......................... 202110984258.X

(51) Int. Cl.
| | |
|---|---|
| *B01J 31/16* | (2006.01) |
| *B01J 35/00* | (2006.01) |
| *B01J 35/10* | (2006.01) |
| *B01J 37/00* | (2006.01) |
| *B01J 37/02* | (2006.01) |
| *B01J 37/03* | (2006.01) |
| *B01J 37/04* | (2006.01) |

(52) U.S. Cl.
CPC ....... *B01J 31/1691* (2013.01); *B01J 35/0013* (2013.01); *B01J 35/1019* (2013.01); *B01J 35/1057* (2013.01); *B01J 35/1061* (2013.01); *B01J 37/009* (2013.01); *B01J 37/0236* (2013.01); *B01J 37/031* (2013.01); *B01J 37/04* (2013.01)

(58) Field of Classification Search
None
See application file for complete search history.

(56) References Cited

PUBLICATIONS

Zheng et al. RSC Advances, 2016, 6, 71767 (Year: 2016).*

* cited by examiner

*Primary Examiner* — Yun Qian
(74) *Attorney, Agent, or Firm* — Nevrivy Patent Law Group P.L.L.C.

(57) ABSTRACT

The disclosure is related to the field of preparation of nanometer materials, and, in particular, to a method for synthesizing a 2D ultrathin zeolitic imidazolate framework-67 (ZIF-67) with a hierarchical porous structure, the method converting ZIF-67 from nanoparticles into 2D ultrathin nanosheets with a hierarchical porous structure by controlling a dropping amount of water and the reaction time. With the method, the 2D ultrathin ZIF-67 with a hierarchical porous structure can be made from readily available starting materials in a one pot synthesis. The method is feasible on industrial scale and has both economic and environmental benefits due to the simple process and low cost.

8 Claims, 5 Drawing Sheets

METHOD FOR SYNTHESIZING 2D ULTRATHIN ZIF-67 WITH HIERARCHICAL POROUS STRUCTURE

CROSS REFERENCE TO RELATED APPLICATION

This patent application claims the benefit and priority of Chinese Patent Application No. 202110984258.X, filed on Aug. 25, 2021, the disclosure of which is incorporated by reference herein in its entirety as part of the present application.

TECHNICAL FIELD

The disclosure is related to the field of preparation of nanometer materials, and, in particular, to a method for synthesizing a 2D ultrathin zeolitic imidazolate framework-67 (ZIF-67) with a hierarchical porous structure.

BACKGROUND ART

Metal-organic frameworks (MOFs) are a class of porous materials consisting of metal ions or metal oxide clusters coordinated to organic ligands to form a highly ordered three-dimensional (3D) structure. MOFs have been widely used in catalytic fields such as photocatalysis and electrocatalysis due to their adjustable chemical composition, high porosity, and high specific surface area. Over the past decade, remarkable efforts have been attributed to the synthesis of MOFs with new structures and functions. Conventional microporous MOFs with a block shape exhibit low mass transfer rate and low electric conductivity, which greatly limit their applications. There is, therefore, an urgent need for a two-dimensional (2D) MOF material which exhibits high mass transfer rate and high conductivity.

One of the most frequently used methods for improving chemical-physical properties of the MOFs is to regulate their morphology and structure. Nanosheet self-assembled 3D hierarchical porous structure is considered to be an ideal nanostructure of the MOFs. Compared with blocky MOFs, 2D ultrathin MOFs with a hierarchical porous structure have: 1) very short transport paths and thus high mass transfer rate and high conductivity due to their self-assembled pore structure and thickness (<5 nm) of a few atoms; 2) a high percentage of atoms having exposed active surfaces, coordinately unsaturated atoms, and dangling bonds, all of which can provide more active sites and facilitate the interaction between the catalytic centers on the MOFs and the reactant molecules, enabling the 2D ultrathin MOFs to exhibit higher catalytic activity; and 3) unique chemical-physical properties (electronic/band structure) which may induce quantization effect. Furthermore, their self-assembled nanostructure can help to effectively suppress agglomeration of the nanosheets and formation of a wrinkle therein during reaction and ensure that the active sites are exposed.

The 2D ultrathin MOFs with a hierarchical porous structure are currently made by a top-down approach or a bottom-up approach. The top-down approach is usually suitable for making MOFs with a layered structure only, and it has some difficulties in precisely controlling the size and thickness of the formed nanosheets. With the bottom-up approach, 2D MOFs can be made by controlling the growth rates of specific crystal faces or the confinement effect using a surfactant or organic reagents which are insoluble to each other. The bottom-up approach is suitable for the synthesis of most MOFs, but one specific set of process conditions required by this approach is only suitable for the synthesis of just one or several MOFs. In addition, the surfactant or organic reagents add to the cost of implementing the approach, and also tend to cover the surface active sites of the MOFs. These limitations greatly affect the synthesis, quality, and industrial mass production of the MOFs. Therefore, it is of great interest to provide a simple method for making 2D and hierarchical porous MOFs, which does not require the use of a surfactant.

SUMMARY

In view of the above problems, one objective of the present disclosure is to provide a method for synthesizing a 2D ultrathin zeolitic imidazolate framework-67 (ZIF-67) with a hierarchical porous structure, which converts ZIF-67 from nanoparticles into 2D ultrathin nanosheets with a hierarchical porous structure by controlling a dropping volume of water and the reaction time.

The objective is realized by a method for synthesizing a 2D ultrathin ZIF-67 with a hierarchical porous structure, comprising steps of:
(i) dissolving cobalt nitrate hexahydrate and 2-methylimidazole in methanol at room temperature to form a first solution and a second solution, respectively;
(ii) adding dropwise the first solution to the second solution through a peristaltic pump, followed about 10 minutes later by dropwise addition of a volume of water, to conduct a reaction while stirring; and
(iii) subjecting a reaction mixture resulting from the reaction to centrifugal separation to obtain a purple precipitate, which is washed by centrifugation with methanol and then freeze dried.

The first solution of cobalt nitrate hexahydrate obtained in the step (i) may have a concentration of about 0.01 to 0.7 g/mL. The second solution of 2-methylimidazole obtained in the step (i) may have a concentration of about 0.025 to 0.4 g/mL.

The stirring operation in the step (i) may be carried out at a rate of about 100 to 800 rpm for about 20 to 50 minutes.

In the step (ii), the volume ratio of the first solution to the second solution may be from about 0.2 to 5.

In the step (ii), the volume ratio of the water to the second solution may be from about 0.05 to 2.

In the step (ii), the first solution and the water may be each added dropwise to the second solution at a dropping rate of about 100 to 15,000 μL/min.

The stirring operation in the step (ii) may be carried out at a rate of about 500 rpm for about 1 to 72 hours.

The freeze drying process in the step (iii) may be carried out at about 50° C. below zero for about 4 to 72 hours.

The 2D ultrathin ZIF-67 made by the present method can have a thickness of less than 5 nanometers (nm), a BET specific surface area of about 200 to 400 $cm^2/g$, and a micro- and/or meso-pore structure having a pore size of about 1.1 to 1.5 nm and about 35 to 40 nm, respectively.

Based on the difference in stability of the Co—N coordination bond in different solvents, the present method proposes to add a solution containing $Co^{2+}$ ions and then water to a methanol solution of 2-methylimidazole in a dropwise manner and control the addition time and the volume of water added, so as to regulate nucleation and growth of the crystals as well as the solid phase transition and convert ZIF-67 from nanoparticles into 2D ultrathin nanosheets with a hierarchical porous structure. In this way, a 2D ultrathin (<5 nm) ZIF-67 with a hierarchical porous structure is made, and it is also found that it has an abundance of coordinately unsaturated cobalt centers.

The method of the present disclosure has several advantages.

With the method, a 2D ultrathin (<5 nm) ZIF-67 with a hierarchical porous structure can be made from readily available starting materials in a one pot synthesis without the use of any surfactant.

Materials and equipment required by the method are readily available. In addition, the method is feasible on industrial scale due to the simple process, manageable process conditions, low cost, safety, and high efficiency.

DETAILED DESCRIPTION OF THE EMBODIMENTS

In one embodiment, the present disclosure provides a method for synthesizing a 2D ultrathin ZIF-67 with a hierarchical porous structure, comprising steps of:
  (i) adding 0.2 to 3.5 g of cobalt nitrate hexahydrate and 0.5 to 2 g of 2-methylimidazole to 5 to 20 mL of methanol and stirring at a rate of 100 to 800 rpm for 20 to 50 minutes at room temperature so as to form a first solution and a second solution, respectively;
  (ii) adding dropwise the first solution to the second solution (volume ratio=0.2-5) through a peristaltic pump at a dropping rate of 100 to 15,000 μL/min, followed about 10 minutes later by dropwise addition of water at 5 to 200 volume % with respect to the second solution at a dropping rate of 100 to 15,000 μL/min, to conduct a reaction for 1 to 72 hours while stirring at a rate of 500 rpm; and
  (iii) subjecting a reaction mixture resulting from the reaction to centrifugal separation so as to obtain a purple precipitate, which is washed by centrifugation 3 times using methanol and then frozen in a refrigerator followed by freeze drying at 50° C. below zero for 4 to 72 hours in a freeze drier to give a 2D ultrathin (<5 nm) ZIF-67 with a hierarchical porous structure.

In order to make the objective, features, and advantages of the present disclosure more clear, the present disclosure will now be illustrated in further detail by way of the following examples in combination with the drawings. However, these examples are for the illustrative purpose only and are not intended to limit the scope of the disclosure. It should be noted that each of the features in the embodiments is not only applicable to one of the embodiments, but also be applicable to other embodiments in combination with other features, as long as not causing conflicts with each other.

Example 1

0.546 g of cobalt nitrate hexahydrate was added to 15 mL of methanol and stirred at a rate of 500 rpm for 30 min at room temperature to form a first solution. 0.632 g of 2-methylimidazole was added to 15 mL of methanol and stirred at a rate of 500 rpm for 30 min at room temperature to form a second solution.

The first solution was added dropwise to the second solution through a peristaltic pump at a dropping rate of 500 μL/min About 10 minutes later, 5 mL of water was also added dropwise to the second solution containing the first solution at a dropping rate of 500 μL/min. Then, the mixture was stirred at a rate of 500 rpm and reacted for 2, 4, 6, and 12 h respectively.

After the completion of the reaction, the reaction mixture was subjected to centrifugal separation, which gave a purple precipitate. The precipitate was washed by centrifugation 3 times using methanol and then frozen in a refrigerator, followed by freeze drying at 50° C. below zero for 8 h in a freeze drier.

Figure 1:
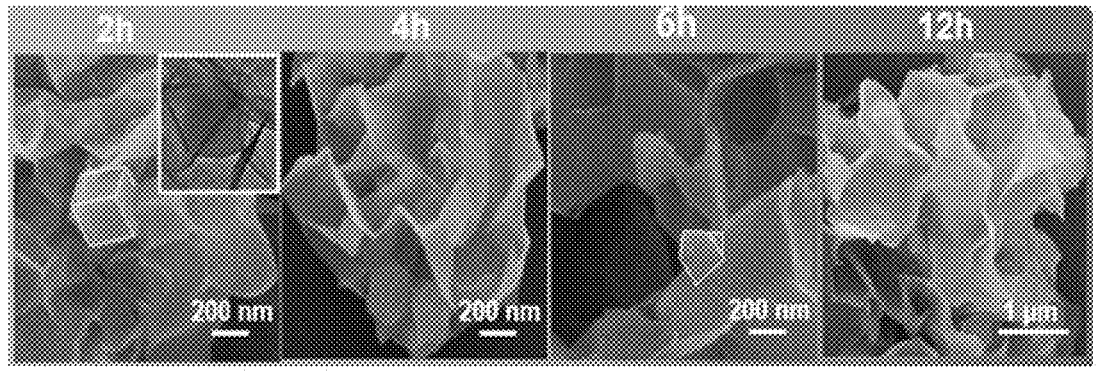
FIG. 1 shows SEM images of ZIF-67 products produced after 2, 4, 6, and 12 h of reaction in Example 1 respectively from left to right of the figure.

FIG. 1 shows SEM images of the ZIF-67 products produced after 2, 4, 6, and 12 h of reaction in this example respectively from left to right of the figure. As apparent from the figure, at 2 h, the ZIF-67 product was presented in the form of regular small particles having a size of about 200 nm. Nanosheets that had been epitaxially grown from the nanoparticles became larger with longer reaction time and wrapped the nanoparticles. At 6 h, the ZIF-67 nanoparticles were converted from a regular polyhedron shape into an irregular tetrahedron shape, and their size was further reduced (to less than 200 nm). At 12 h, all of the ZIF-67 nanoparticles were converted into a 2D and ultrathin hierarchical porous structure.

Example 2

0.546 g of cobalt nitrate hexahydrate was added to 15 mL of methanol and stirred at a rate of 500 rpm for 30 min at room temperature to form a first solution. 0.632 g of 2-methylimidazole was added to 15 mL of methanol and stirred at a rate of 500 rpm for 30 min at room temperature to form a second solution.

The first solution was added dropwise to the second solution through a peristaltic pump at a dropping rate of 500 μL/min. About 10 minutes later, 1, 2.5, 5, or 10 mL of water (corresponding to 6.7, 16.7, 33.3, and 66.7 volume % with respect to the second solution, respectively) was also added dropwise to the second solution containing the first solution at a dropping rate of 500 μL/min. Then, the mixture was stirred at a rate of 500 rpm and reacted for 24 h.

After the completion of the reaction, the reaction mixture was subjected to centrifugal separation, which gave a purple precipitate. The precipitate was washed by centrifugation 3 times using methanol and then frozen in a refrigerator, followed by freeze drying at 50° C. below zero for 8 h in a freeze drier.

Figure 2:
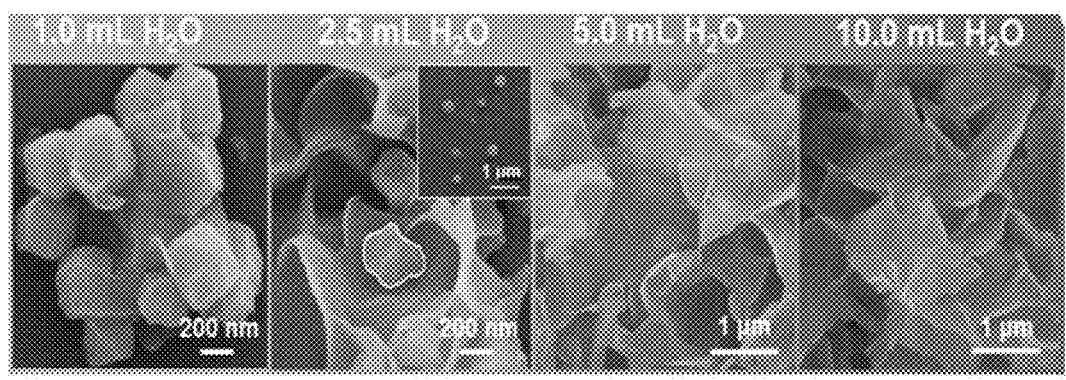
FIG. 2 shows SEM images of ZIF-67 products produced with the addition of 1, 2.5, 5, and 10 mL of water respectively from left to right of the figure.

FIG. 2 shows SEM images of the ZIF-67 products produced with the addition of 1, 2.5, 5, and 10 mL of water respectively from left to right of the figure. As apparent from this figure, when 1 mL of water was added, most of the ZIF-67 product was presented in the form of regular polyhedron particles having a convoluted surface and an epitaxially grown nanosheet. When 2.5 mL of water was added, the regular polyhedron particles were changed into irregular particles having more significant wrinkles, and their epitaxially grown nanosheets were further grown. By contrast, when a volume of water equal to or greater than 5 mL was added, ultrathin ZIF-67 nanosheets were produced and crosslinks were formed therebetween, making the ZIF-67 product a self-supporting hierarchical porous material.

Example 3

0.546 g of cobalt nitrate hexahydrate was added to 15 mL of methanol and stirred at a rate of 500 rpm for 30 min at room temperature to form a first solution. 0.632 g of 2-methylimidazole was added to 15 mL of methanol and stirred at a rate of 500 rpm for 30 min at room temperature to form a second solution.

The first solution was added dropwise to the second solution through a peristaltic pump at a dropping rate of 500 μL/min About 10 minutes later, 5 mL of water was also added dropwise to the second solution containing the first solution at a dropping rate of 500 μL/min. Then, the mixture was stirred at a rate of 500 rpm and reacted for 24 h.

After the completion of the reaction, the reaction mixture was subjected to centrifugal separation, which gave a purple precipitate. The precipitate was washed by centrifugation 3 times using methanol and then frozen in a refrigerator, followed by freeze drying at 50° C. below zero for 8 h in a freeze drier.

Figure 3:
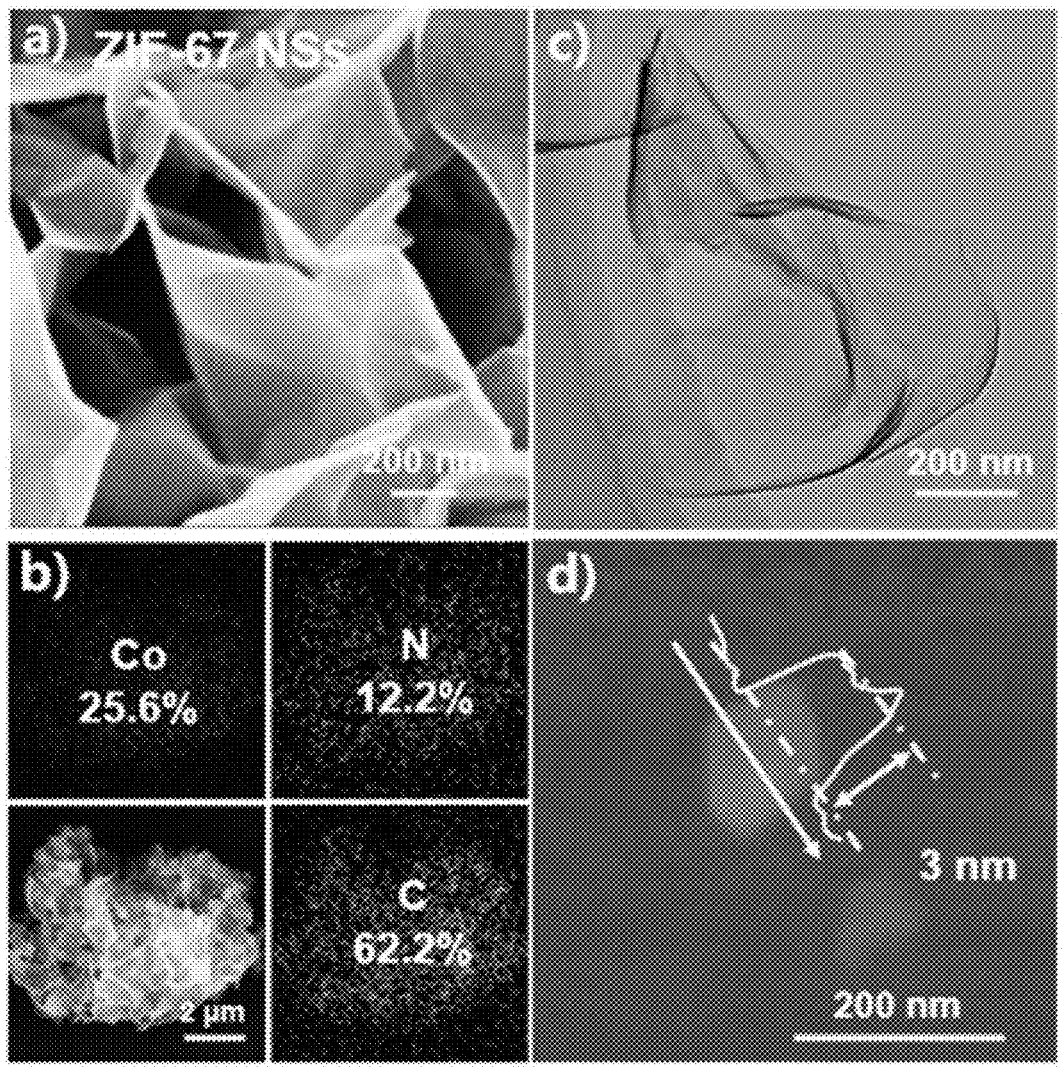
FIG. 3 shows (a) a SEM image, (b) an X-ray photoelectron spectroscopy image, (c) a TEM image, and (d) an atomic force microscope (AFM) image of a ZIF-67 product obtained in Example 3.

FIG. 3 shows (a) a SEM image, (b) an X-ray photoelectron spectroscopy image, (c) a TEM image, and (d) an atomic force microscope (AFM) image of the ZIF-67 product obtained in this example. As seen from FIG. 3(a), the ZIF-67 product had a hierarchical porous structure formed due to the fact that the nanosheets were supported to each other. FIG. 3(b) shows that the ZIF-67 product consisted of three elements, namely Co, C, and N, and these elements were each distributed evenly throughout the nanosheets. FIGS. 3(c) and 3(d) shows that the ZIF-67 material product was an ultrathin material having a thickness of about 3 nm.

Figure 4:
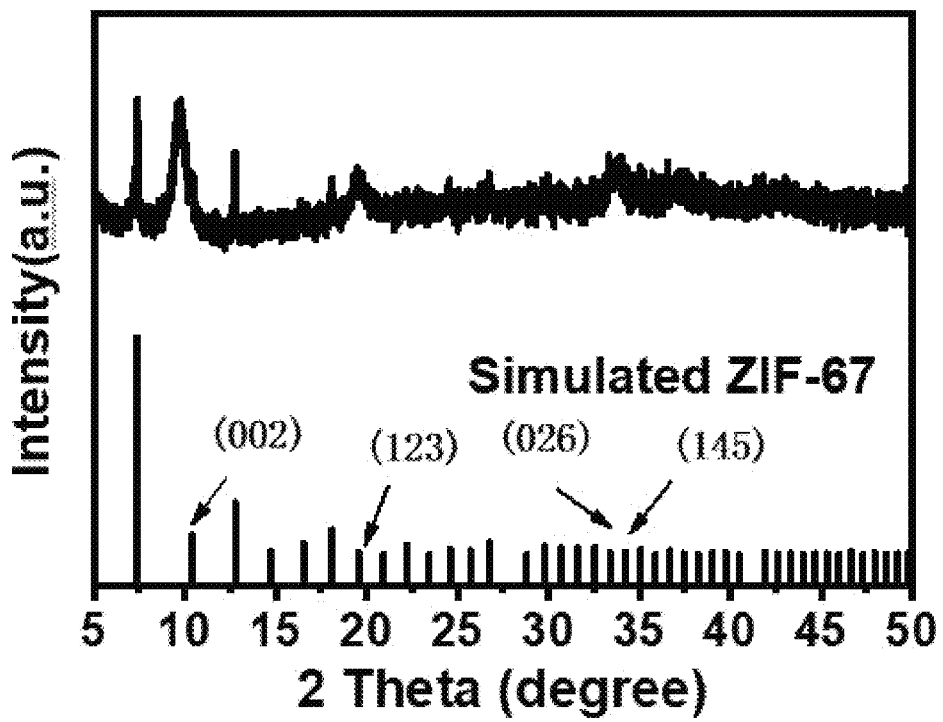
FIG. 4 shows an X-ray diffraction (XRD) pattern of the product obtained in Example 3.

FIG. 4 shows an XRD pattern of the product, which is consistent to the normal pattern of ZIF-67.

Figure 5:
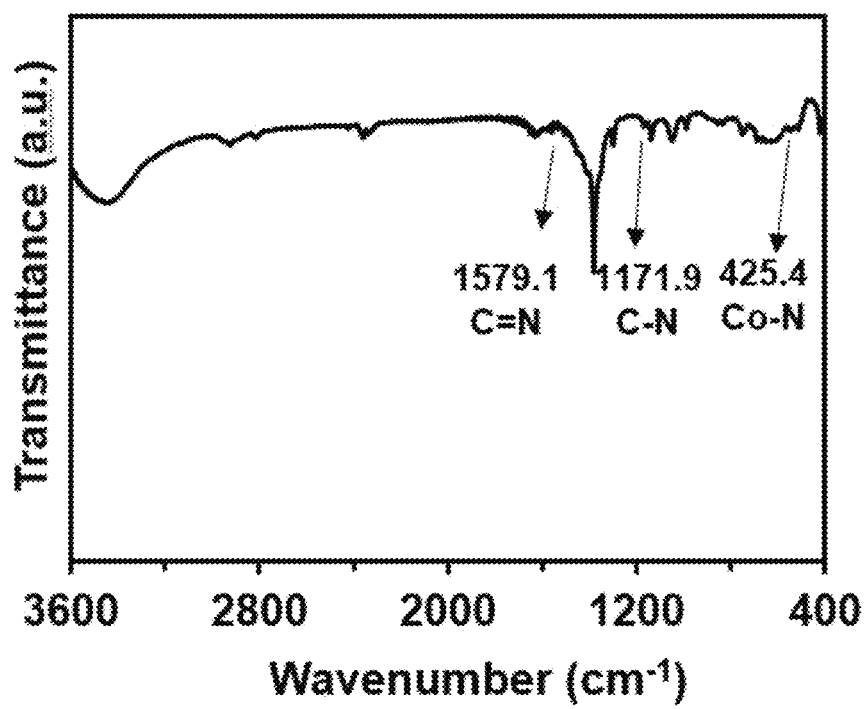
FIG. 5 shows a fourier transform infrared (FT-IR) spectrum of the product obtained in Example 3.

FIG. 5 shows a FT-IR spectrum of the product.

Figure 6:
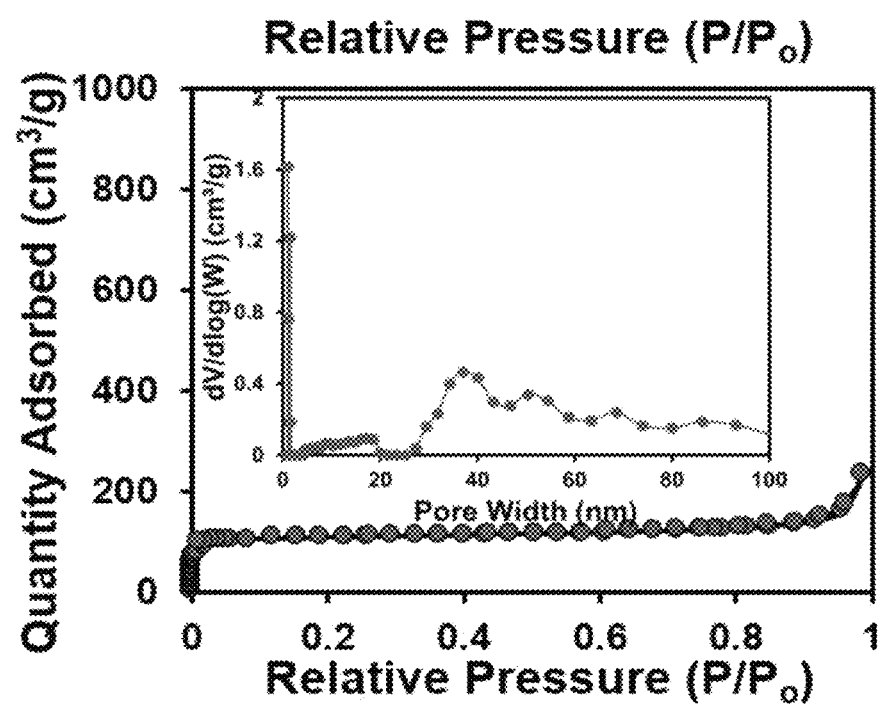
FIG. 6 is a graph showing the adsorption-desorption of nitrogen gas from the ZIF-67 product obtained in Example 3 and the pore size distribution of the product.

FIG. 6 is a graph showing the adsorption-desorption of nitrogen gas from the ZIF-67 product and the pore size distribution of the product. It can be seen from this figure that the ZIF-67 product had a BET surface area of 400 cm$^2$/g. The nitrogen adsorption-desorption isotherm illustrates the presence of a hysteresis loop, which shows that the ZIF-67 product had micropores with a pore size of about 1.5 nm and mesopores with a pore size of about 40 nm.

Comparative Example 0.546 g of cobalt nitrate hexahydrate was added to 15 mL of methanol and stirred at a rate of 500 rpm for 30 min at room temperature to form a first solution. 0.632 g of 2-methylimidazole was added to 15 mL of methanol and stirred at a rate of 500 rpm for 30 min at room temperature to form a second solution.

The first solution was added dropwise to the second solution through a peristaltic pump at a dropping rate of 500 μL/min. The mixture was stirred at a rate of 500 rpm and reacted for 24 h.

After the completion of the reaction, the reaction mixture was subjected to centrifugal separation, which gave a purple precipitate. The precipitate was washed by centrifugation 3 times using methanol and then frozen in a refrigerator, followed by freeze drying at 50° C. below zero for 8 h in a freeze drier.

Figure 7:
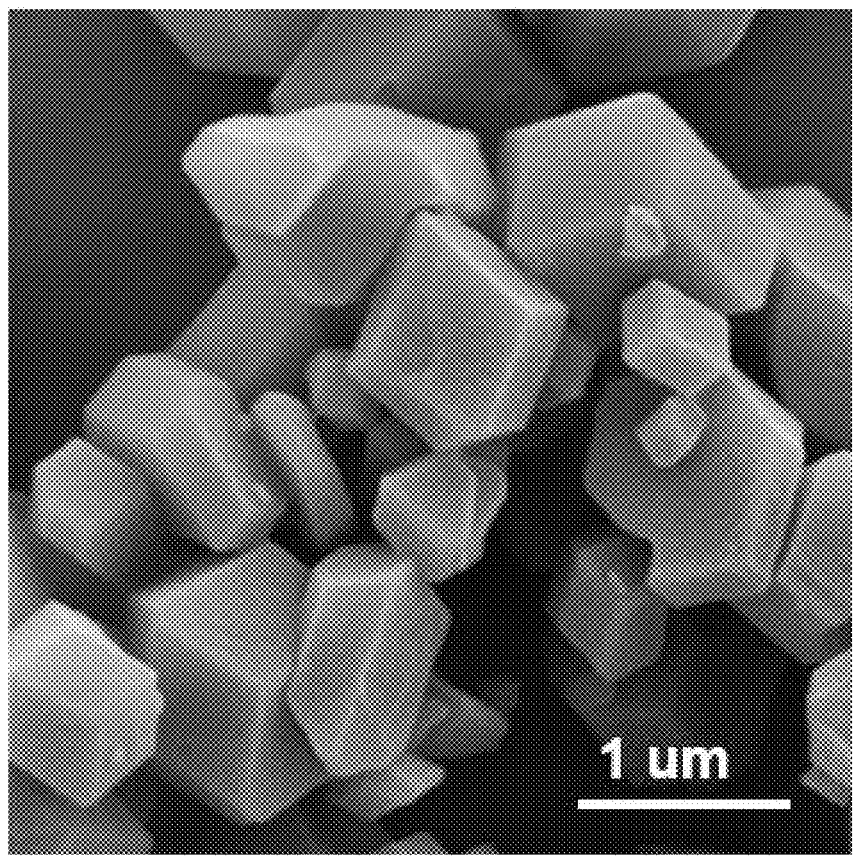
FIG. 7 shows a SEM image of a product obtained in Comparative Example.

FIG. 7 shows a SEM image of the product obtained in this comparative example which did not require the dropwise addition of water to the second solution, the SEM image showing that the obtained product was in the form of polyhedron particles with non-uniform particle size.

The descriptions above are just preferred embodiments of the disclosure. Various modifications or changes may be made thereto without departing from the scope of the present disclosure.

What is claimed is:

1. A method for synthesizing a 2D ultrathin ZIF-67 with a hierarchical porous structure and having a thickness of less than 5 nanometers (nm), comprising steps of:
    (i) dissolving cobalt nitrate hexahydrate and 2-methylimidazole in methanol at room temperature to form a first solution and a second solution, respectively;
    (ii) after the stirring, adding dropwise the first solution to the second solution through a peristaltic pump, followed about 10 minutes later by dropwise addition of a volume of water, to conduct a reaction while stirring, wherein the volume ratio of the water to the second solution is from 0.05 to 2; and
    (iii) subjecting a reaction mixture resulting from the reaction to centrifugal separation to obtain a purple precipitate, which is washed by centrifugation with methanol and then freeze dried.

2. The method of claim 1, wherein the first solution of cobalt nitrate hexahydrate obtained in the step (i) has a concentration of 0.01 to 0.7 g/mL, and the second solution of 2-methylimidazole obtained in the step (i) has a concentration of 0.025 to 0.4 g/mL.

3. The method of claim 1, wherein the stirring operation in the step (i) is carried out at a rate of 100 to 800 rpm for 20 to 50 minutes.

4. The method of claim 1, wherein, in the step (ii), the volume ratio of the first solution to the second solution is from 0.2 to 5.

5. The method of claim 1, wherein, in the step (ii), the first solution and the water are each added dropwise at a dropping rate of 100 to 15,000 μL/minute.

6. The method of claim 1, wherein, the stirring operation in the step (ii) is carried out at a rate of 500 rpm for 1 to 72 hours.

7. The method of claim 1, wherein, the freeze drying process in the step (iii) is carried out at about 50° C. below zero for 4 to 72 hours.

8. The method of claim 1, wherein, the 2D ultrathin ZIF-67 made by the method has a thickness of less than 5 nm, a BET specific surface area of 200 to 400 cm$^2$/g, and a micro- and/or meso-pore structure having a pore size of 1.1 to 1.5 nm and 35 to 40 nm, respectively.

* * * * *